J. E. MARRINER.
ACCELERATOR SAFETY GUARD.
APPLICATION FILED DEC. 17, 1917.

1,265,801.

Patented May 14, 1918.

INVENTOR.
James E. Marriner
BY
Reginald Verrier
ATTORNEY.

UNITED STATES PATENT OFFICE.

JAMES E. MARRINER, OF PORTLAND, MAINE.

ACCELERATOR SAFETY-GUARD.

1,265,801.

Specification of Letters Patent.

Patented May 14, 1918.

Application filed December 17, 1917. Serial No. 207,414.

*To all whom it may concern:*

Be it known that I, JAMES E. MARRINER, a citizen of the United States, residing at Portland, in the county of Cumberland and State of Maine, have invented certain new and useful Improvements in Accelerator Safety-Guards, of which the following is a specification.

It is well known that in the driving of automobiles serious accidents frequently occur occasioned by the foot of the operator coming into engagement with the accelerator pedal when not intended and when such accidental engagement suddenly increases the speed of the machine, resulting in great damage.

The object of this invention is broadly to provide means for preventing such accidental operation of the accelerator pedal even if the foot of the operator slips as may happen in dangerous places.

Its object is specially to provide a simple device adapted to be readily applied to the machine between the clutch or brake pedal and the accelerator pedal. If the accelerator pedal is located between the clutch and brake pedals a guard may be used on each side of the accelerator pedal.

Figure 1:
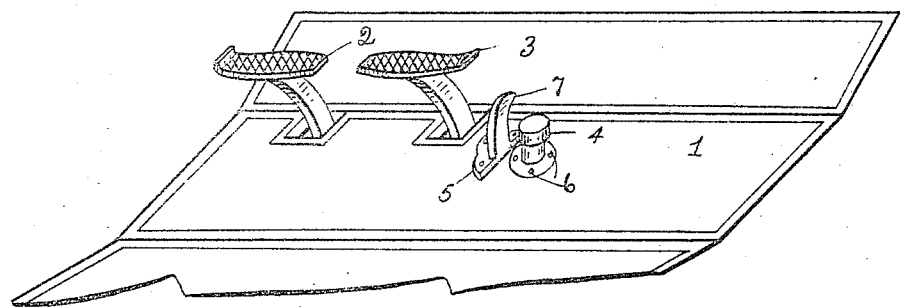
Figure 2:
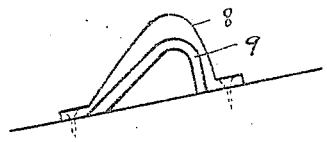
Figure 3:
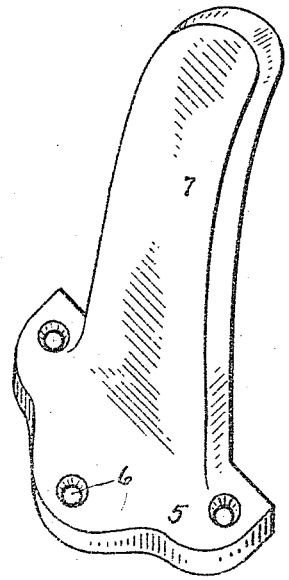

In the drawings herewith accompanying and making a part of this application, Figure 1 is a perspective view of a portion of a conventional automobile showing floor and clutch, brake and accelerator pedals and my improved pedal guard in normal position; Fig. 2 is a detail view of a modified form of accelerator pedal and a modified form of my improved guard for use therewith, and Fig. 3 is an enlarged perspective view of the guard shown in Fig. 1.

Same reference characters indicate like parts in the several figures.

In said drawing, 1 represents the floor, 2 the clutch pedal, 3 the brake pedal and 4 the accelerator pedal of an automobile, all in normal position. Located between the brake pedal and the accelerator pedal I place my improved safety guard. It comprises a base 5 by which it may be readily secured to the floor by screws or bolts passing through holes 6 in the base. Projecting upward from this base to a point above the top of the accelerator pedal is a post or plate 7 which forms the guard proper and by which any accidental movement of the foot is warded off from striking the pedal.

In actual use I have found that the safety guard should extend somewhat above the top of the accelerator pedal when in normal position; but the relative height of the guard and the relative distance of the guard from the pedal may differ to meet the requirements of different styles of pedals. It may be inclined toward the pedal. The shape of the guard may also be varied to accommodate it to pedals of different styles, as for example, the guard 8 shown in Fig. 2 is wider than that shown in Fig. 1 because the pedal 9 is wider. It is apparent that it will serve also as a guide to the foot operating the accelerator. It is also noted that with my improved guard it is impossible to strike the accelerator pedal except when intended.

I claim:

In a vehicle, the combination with a brake pedal and an accelerator pedal of a vehicle, of an accelerator pedal safety guard comprising a post fixedly positioned between said pedals and spaced apart from each of them, the height of the post being greater than that of the accelerator pedal and less than that of the brake pedal when said pedals are in their normal position.

In testimony whereof I affix my signature.

JAMES E. MARRINER.